US006424754B1

(12) United States Patent
Carrott et al.

(10) Patent No.: US 6,424,754 B1
(45) Date of Patent: Jul. 23, 2002

(54) OPTICAL MODULATOR RESPONSIVE TO AT LEAST TWO ELECTRIC SIGNALS

(75) Inventors: David T. Carrott, Bristow, VA (US); Mahir A. Nayfeh, Catonsville, MD (US)

(73) Assignee: Tasc, Inc., Reading, MA (US)

( * ) Notice: Subject to any disclaimer, the term of this patent is extended or adjusted under 35 U.S.C. 154(b) by 89 days.

(21) Appl. No.: 09/671,743

(22) Filed: Sep. 29, 2000

(51) Int. Cl.[7] ............................. G02F 1/01; G02F 1/03
(52) U.S. Cl. ...................... 385/2; 385/4; 385/1; 385/8; 359/245; 359/254
(58) Field of Search ................. 385/2, 1, 4, 8; 359/245, 254

(56) References Cited

U.S. PATENT DOCUMENTS

| | | | | |
|---|---|---|---|---|
| 5,076,655 A | * | 12/1991 | Bridges | 385/2 |
| 5,309,532 A | * | 5/1994 | Chang et al. | 385/1 |

FOREIGN PATENT DOCUMENTS

EP 443636 * 8/1991

* cited by examiner

*Primary Examiner*—Georgia Epps
*Assistant Examiner*—M. Hasan
(74) *Attorney, Agent, or Firm*—Lowe Hauptman Gilman & Berner, LLP

(57) ABSTRACT

First and second AC electric sources modulate a coherent wave constant amplitude optical beam. An optical waveguide arrangement responsive to the optical wave, includes first and second pairs of electrodes respectively connected to be responsive to the first and second AC sources. The electrode pairs are capacitively coupled to first and second portions of the optical waveguide arrangement for amplitude modulating the optical wave propagating in the first and second portions in accordance with the first and second AC sources, respectively. The first and second portions of the optical waveguide arrangement are coupled together so that the waves modulated in the first and second portions are combined to derive a third coherent modulated optical wave.

11 Claims, 2 Drawing Sheets

OPTICAL MODULATOR RESPONSIVE TO AT LEAST TWO ELECTRIC SIGNALS

TECHNICAL FIELD

The present invention relates generally to apparatus for modulating a coherent optical wave and more particularly to an apparatus for modulating a coherent optical wave in response to plural electric signals capacitively coupled to plural portions of an optical waveguide arrangement responsive to the coherent optical wave.

BACKGROUND ART

FIGS. 1 and 2 are respectively a schematic diagram and a cross-sectional view of an apparatus for imposing amplitude modulation on an amplitude modulated coherent wave optical beam laser 10 derives. The amplitude modulation of the beam laser 10 emits is in response to an AC, usually RF, signal that source 12 derives and applies directly to laser 10. Optical modulator 16 heterodynes the amplitude modulated beam laser 10 derives with the output signal of RF source 14. Modulator 16 thus derives a coherent wave optical beam having amplitude variations directly proportional to the product of the signals RF sources 12 and 14 derive. Under idealized circumstances, optical modulator 16 derives a coherent wave optical beam having components that are directly proportional to:

$$AB \sin[(\omega_1-\omega_2)t+(\phi_1-\phi_2)] \quad (1)$$

$$AB \sin[(\omega_1-\omega_2)t+(\phi_1+\phi_2)] \quad (2),$$

where

A and B are respectively the peak amplitudes of the signals sources 12 and 14 derive, $\omega_1$ and $\omega_2$ are respectively the angular frequencies of signals that sources 12 and 14 derive, and $\phi_1$ and $\phi$ are respectively the phase angles of the signals that sources 12 and 14 derive.

The coherent wave optical beam optical modulator 16 derives also frequently includes components that are directly proportional to:

$$A \sin(\omega_1 t+\phi_1) \quad (3)$$

$$B \sin(\omega_2 t+\phi_2) \quad (4).$$

Optical modulator 16 includes fiber optic waveguide 18 embedded in solid dielectric plate 20, so that input face 22 of fiber optic waveguide 18 is positioned to be responsive to the coherent wave optical beam laser 10 derives. Modulator 16 includes metal electrodes 24 and 26, plates coated on the top surface of dielectric plate 20 on opposite sides of fiber optic waveguide 18. RF source 14 drives electrodes 24 and 26 by virtue of an ungrounded output terminal of source 14 being connected to electrode 24 and a grounded output terminal of source 14 being connected to grounded electrode 26. Electrodes 24 and 26 are capacitively coupled to fiber optic waveguide 18 so that electric field 19 (FIG. 2), established between electrodes 24 and 26, is coupled to the portion of waveguide 18 between electrodes 24 and 26. As illustrated in FIG. 2, electric field 19 penetrates through solid dielectric plate 20 as well as the portion of fiber optic waveguide 18 between electrodes 24 and 26.

The electric field variations that RF source 14 establishes in the portion of fiber optic waveguide 18 between electrodes 24 and 26 amplitude modulates the coherent wave optical beam laser 10 derives. The resulting coherent wave optical beam in the portion of fiber optic waveguide 18 downstream of electrodes 24 and 26 thus includes the frequency components of RF sources 12 and 14, as sum and difference frequencies that are amplitude modulated on the optical carrier frequency of laser 10. The amplitude of the coherent optical wave downstream of electrodes 24 and 26 can thus be considered as the product of the output signals of RF sources 12 and 14. The portion of optical fiber waveguide 18 downstream of electrodes 24 and 26 supplies the coherent wave optical beam including the products resulting from multiplication of the signals of sources 12 and 14 to a suitable optical-electric transducer 28. Transducer 28, typically a photo-electric detector, such as a diode or transistor, derives an electric signal that is a replica of the amplitude variations of the coherent wave optical beam incident on it, i.e., the optical beam at the output of modulator 16.

A problem with the structure illustrated in FIG. 1 is that the transfer function of optical modulator 16 in response to the signal that source 14 applies to electrodes 24 and 26 is quite different from the transfer function of laser 10 in response to RF source 12. These transfer function differences are such that the response time of laser 10 to RF source 12 is considerably different from the response time of modulator 16 to RF source 14. In addition, laser 10 and modulator 16 have different non-linearities. Calibrating the apparatus illustrated in FIG. 1 is difficult because of these factors.

It is, accordingly, an object of the present invention to provide a new and improved apparatus for modifying a coherent optical wave in response to at least two electric signals that act on the wave in substantially the same way.

Another object of the invention is to provide a new and improved apparatus for amplitude modulating a coherent optical wave in response to two or more electric signals that are coupled to the coherent beam with substantially the same transformer function and by the same mechanism.

SUMMARY OF THE INVENTION

In accordance with one aspect of the invention, an apparatus for modulating a coherent constant amplitude optical wave in response to at least first and second AC electric signal sources comprises an optical waveguide arrangement arranged to be responsive to the optical wave. A first pair of electrodes connected to be responsive to the first AC source and capacitively coupled to a first portion of the optical waveguide arrangement modulates the optical wave propagating in the first portion of the optical waveguide arrangement in accordance with the first AC source. A second pair of electrodes connected to be responsive to the second AC source and capacitively coupled to a second portion of the optical waveguide arrangement modulates the optical wave propagating in the second portion of the optical waveguide arrangement in accordance with the second AC source. The first and second portions of the optical waveguide arrangement are coupled together so that the modulated coherent optical wave derived by the first portion and the modulated coherent optical wave derived by the second portion are combined to derive a third modulated coherent optical wave.

In one embodiment, the second portion of the optical waveguide arrangement is cascaded with first portion of the optical waveguide arrangement so that the second portion of the optical waveguide arrangement derives a coherent optical wave including components containing the sum and difference frequencies of the first and second sources.

In a second embodiment, the optical waveguide arrangement includes a third portion connected to be responsive to the coherent optical waves the first and second portions derive. The first, second and third portions are preferably arranged so the coherent optical waves the first and second portions derive propagate toward each other when entering the third portion. The third portion includes an output optical waveguide segment responsive to the coherent optical waves propagating toward each other from the first and second portions. Preferably, the optical waves the first and second portions derive are supplied to a third portion by aligned optical waveguide segments and via one-way mirrors.

In the preferred arrangement of the second embodiment, the output optical waveguide segment is at an oblique angle to the aligned optical segments, to provide a convenient structure for linearly combining the amplitudes of the optical waves in the aligned optical segments.

Each of the first and second portions of the optical waveguide arrangement preferably includes fiber optic waveguides embedded in a solid dielectric medium and comprises first and second spaced electrodes. The first and second spaced electrodes in both portions are carried by the solid dielectric medium and connected to be responsive to the electric sources.

The above and still further objects, features and advantages of the present invention will become apparent upon consideration of the following detailed description of specific embodiments thereof, especially when taken in conjunction with the accompanying drawings.

BRIEF DESCRIPTION OF THE DRAWINGS

As described.

DESCRIPTION OF THE PREFERRED EMBODIMENTS

Figure 3:
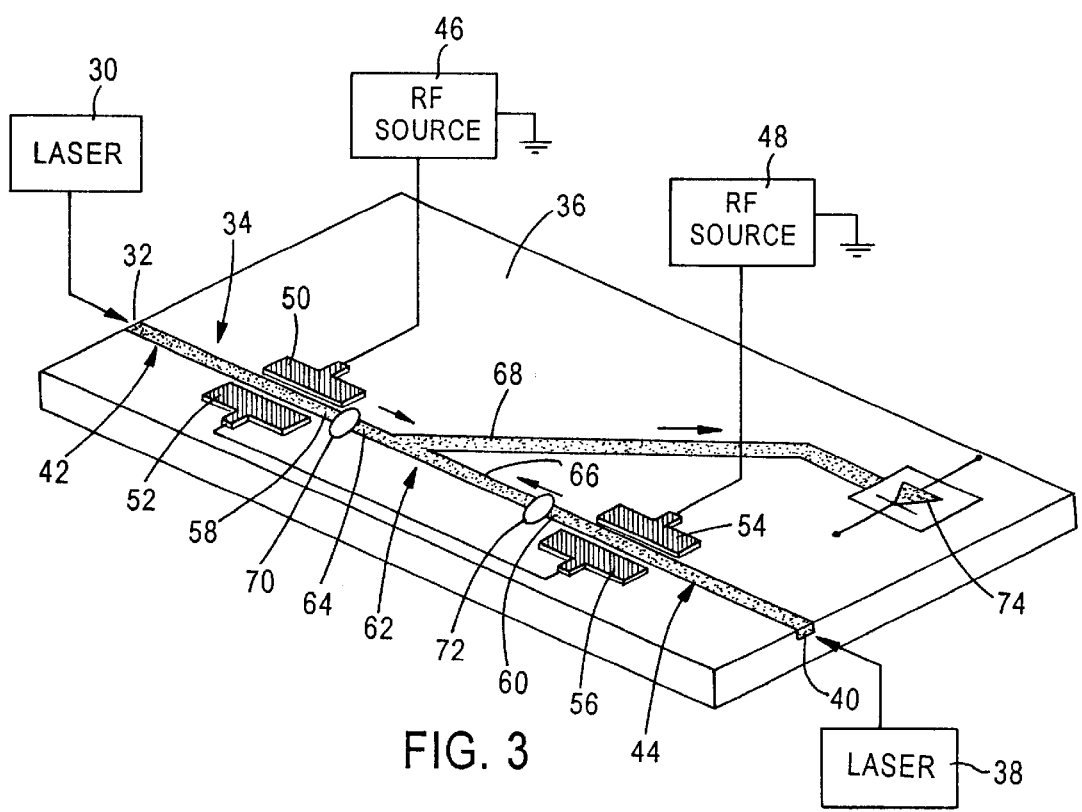
FIG. 3 is a schematic diagram of a first preferred embodiment of the present invention, wherein two electric signal sources are capacitively coupled to two different portions of an optical waveguide arrangement, such that the two different portions propagate coherent optical beams toward each other.

Reference is now made to FIG. 3 of the drawing, wherein laser 30 supplies an unmodulated coherent wave optical beam to one end face 32 of an optical fiber waveguide arrangement 34 embedded in solid dielectric plate 36. Laser 38 supplies an unmodulated coherent wave optical beam to a second end face 40 of optical fiber waveguide arrangement 34. Lasers 30 and 38 supply coherent optical waves having the same frequency to end faces 32 and 40. Alternatively, a single laser can supply coherent optical waves having the same frequency to end faces 32 and 40 via separate optical paths, typically including suitable fiber optic waveguides between the laser output and end faces 32 and 40. End faces 32 and 40 are respectively in first and second amplitude modulator portions 42 and 44 of fiber optic waveguide arrangement 34.

Fiber optic waveguide portions 42 and 44 are respectively responsive to first and second AC, preferably RF, signal sources 46 and 48, as well as the coherent wave optical beams lasers 30 and 38 derive. Portion 42 includes electrodes 50 and 52, respectively connected to ungrounded and grounded terminals of RF source 46, while portion 44 includes electrodes 54 and 56, respectively connected to ungrounded and grounded output terminals of RF source 48. Electrodes 50, 52, 54 and 56 are metal plates coated on a top face of solid dielectric 36. Electrodes 50, 52, 54 and 56 are respectively arranged in pairs on opposite sides of optical fiber waveguide portions 42 and 44 to capacitively couple electric fields that are replicas of the signals from sources 46 and 48 to the coherent wave optical beams that lasers 30 and 38 supply to portions 42 and 44.

The mechanism in portions 42 and 44 for amplitude modulating the coherent wave optical beams propagating therein is the same as the mechanism described in connection with the prior art of FIGS. 1 and 2. Hence, the amplitude of the coherent wave optical beam in fiber optic waveguide segment 58 downstream of electrodes 50 and 52 is a replica of the electric signal source 46 derives, while the amplitude of the coherent wave optical beam in fiber optic waveguide segment 60 downstream of electrodes 54 and 56 is a replica of the electric signal RF source 48 derives.

Optical waveguide segments 58 and 60 are aligned with each other. The optical beams propagating in segments 58 and 60 are linearly combined in optical fiber waveguide combiner portion 62 which includes aligned segments 64 and 66, as well as oblique segment 68. Waveguide segments 58 and 64, as well as waveguide segments 60 and 66, are spatially aligned so that the amplitudes of the coherent wave optical beams propagating therein combine in a differential manner in portion 62.

One-way mirrors 70 and 72 respectively prevent portion 42 from receiving the optical energy that portion 44 propagates to portion 62 and prevent portion 44 from receiving the optical energy portion 42 propagates to portion 62. Mirror 70 is located between optical fiber waveguide segments 58 and 64, while mirror 72 is located between segments 60 and 68. Mirror 70 permits transmission of optical energy from segment 58 to segment 62, but prevents propagation of optical energy from segment 68 into segment 58. Similarly, mirror 72 permits transmission of optical energy from segment 60 to segment 68, but prevents propagation of optical energy from segment 68 into segment 60.

Optical detector 74, preferably in the form of a light sensitive diode, is positioned at the end of segment 68 opposite from the end of the segment 68 which is joined to segments 64 and 68. Detector 74 is a transducer which converts the amplitude of the modulated coherent optical wave in segment 68 into an electric signal.

If the frequencies of RF sources 46 and 48 differ only slightly from each other, the coherent optically modulated wave propagating in segment 68 and detected by detector 74 includes a component representing the beat frequency between the frequencies of sources 46 and 48. Combiner portion 62, under these circumstances, functions similar to a heterodyner of the RF signals that sources 46 and 48 amplitude modulate on the optical carriers lasers 30 and 38 apply to fiber optic waveguide arrangement 34.

The apparatus of FIG. 3 can be calibrated to determine the anomalies of the modulating and combining portions 42, 44 and 62 as well as optical fiber waveguide arrangement 34 by supplying the coherent optical wave laser 30 derives to input faces 32 and 40 and by supplying the same RF signal simultaneously to electrodes 50 and 54, i.e., driving electrodes 50 and 54 in parallel with electric RF signals having the same amplitude, frequency and phase. Ideally, under such circumstances, the amplitudes of the coherent wave optical beams at the intersection of segments 64 and 66 are the same and the amplitude of the coherent optical wave supplied to segment 68 is zero. If, however, the net effect of the optical energy at the intersection of segments 64 and 66 results in a coherent optical wave having a finite non-zero value, detector 74 derives a DC or low frequency output associated with the differences in the characteristics of modulation portions 42 and 44. The signal that detector 74 derives under such circumstances can be used to assist in properly positioning electrode pairs 50, 52 and 54, 56 along the lengths of waveguide segments 64 and 66 or transversely of the waveguide segments during a design phase of the apparatus of FIG. 3.

Figure 4:
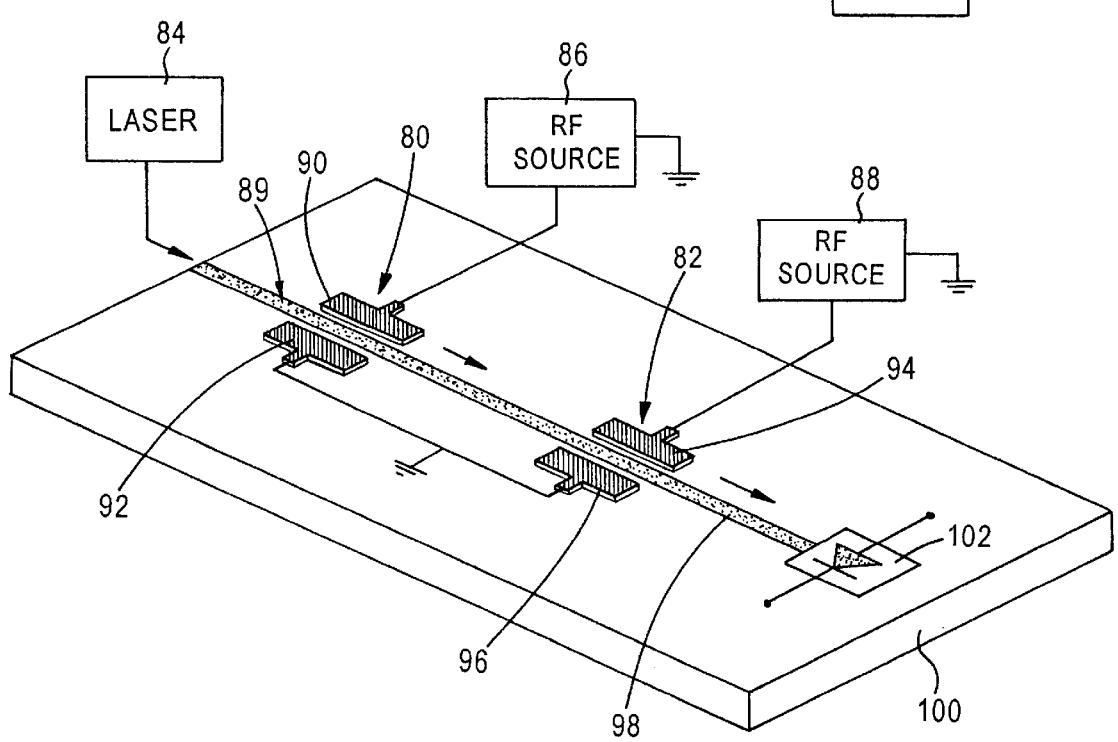
FIG. 4 is a schematic diagram of a further embodiment of the invention wherein two optical modulators are capacitively coupled to two different cascaded portions of an optical waveguide arrangement.

FIG. 4 is a schematic diagram of a second embodiment of an optical modulator in accordance with the present invention. The structure illustrated in FIG. 4 includes an optical fiber waveguide arrangement 89 including first and second cascaded optical amplitude modulator portions 80 and 82 such that modulator portion 80 responds to an unmodulated coherent wave optical beam laser 84 derives and modulator 82 responds to an amplitude modulated coherent wave optical beam modulator 82 derives. Modulators 80 and 82 respectively respond to RF sources 86 and 88 to amplitude modulate the coherent optical beams applied to the modulators.

Figure 1:
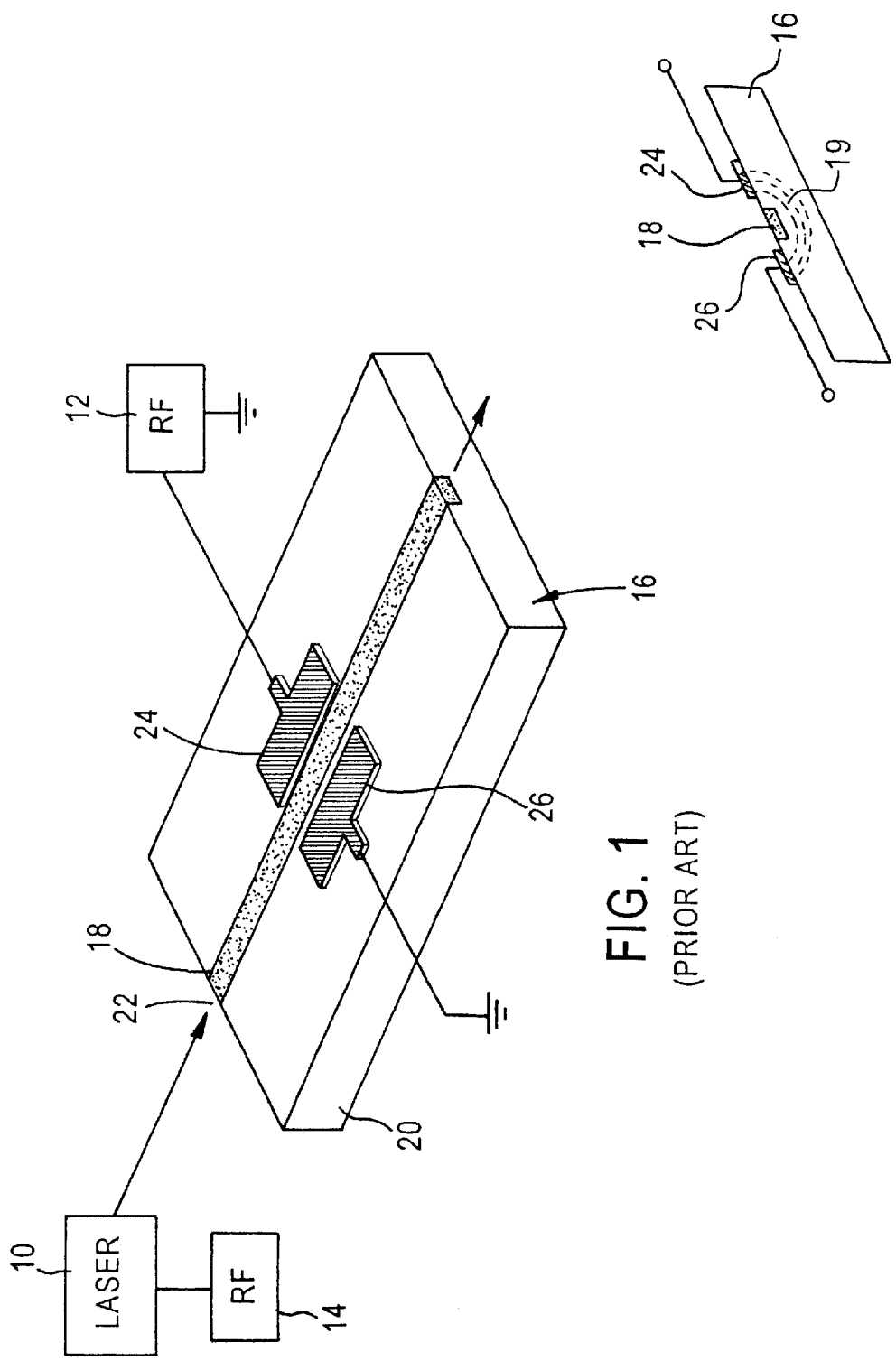
FIGS. 1 and 2 are diagrams of a prior art arrangement for imposing the variations from two electric signals on a coherent optical wave.
Figure 2:
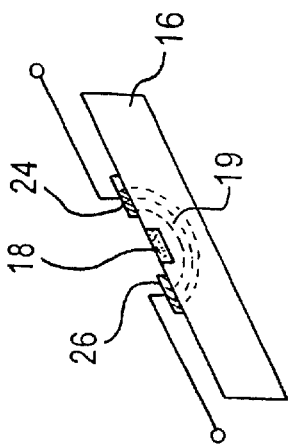

Modulators 80 and 82 are formed in the same way as the modulators of FIGS. 1–3 and thus capacitively couple electric fields to the coherent wave optical beams propagating in optical fiber waveguide arrangement 89. The electric fields result from excitation of electrode pairs 90, 92 and 94, 96 by RF sources 86 and 88, respectively. Electrode pairs 90, 92 and 94, 96 are capacitively coupled to optical fiber waveguide arrangement 89 that is embedded in solid dielectric plate 100, such that electrodes 90, 92 are on opposite sides of the fiber optic waveguide modulator portion 80 and electrodes 94, 96 are on opposite sides of the optical fiber waveguide modulator portion 82. Optical fiber waveguide arrangement 98 has an input face responsive to an unmodulated coherent wave optical beam that laser 84 derives. Electrode pairs 90, 92 and 94, 96 are coated as metal plates on solid dielectric body 100. Fiber optic waveguide 89 has an output end downstream of both of modulators 80 and 82.

The output end of optical fiber waveguide 89 downstream of modulator portion 82 supplies optical energy to photodetector 102 which derives an electric signal in accordance with the product of the electric signals sources 86 and 88 derive. The coherent wave optical beam incident on photodetector 102 includes the components indicated by Equations (1) and (2), supra. To these ends, modulator 80 responds to an electric wave, A sin($\omega_1$t+$\phi_1$) that RF source 86 derives so that the coherent optical wave at the output of modulator 80 has a component with an amplitude directly proportional to A sin ($\omega_1$t+$\phi_1$). The coherent wave optical beam modulator 80 derives is amplitude modulated in modulator 82 by a replica of the signal source 88 derives, which can be represented as B sin($\omega_2$t+$\phi_2$). The coherent wave optical beam immediately downstream of modulator 82, in optical fiber waveguide 89, can thus be considered as including the sum and/or difference frequency components represented in Equation (1) and (2). Diode detector 102 derives an electric signal including components commensurate with Equations (1) and (2). The difference frequency component is the beat frequency between the frequencies of sources 86 and 88.

While there have been described and illustrated specific embodiments of the invention, it will be clear that variations in the details of the embodiments specifically illustrated and described may be made without departing from the true spirit and scope of the invention as defined in the appended claims. For example, more than two modulators can be included. In the embodiment of FIG. 4, the additional modulator(s) can be connected in a cascaded arrangement with modulators 80 and 82. In the embodiment of FIG. 3, an additional modulator can be connected to oblique segment 68 and driven by a third laser. A coherent wave output beam in such a situation could be derived in another fiber optic waveguide segment oblique to segment 68.

What is claimed is:

1. Apparatus for modulating a coherent constant amplitude optical wave in response to signals from at least first and second AC electric sources comprising an optical waveguide arrangement arranged to be responsive to the optical wave, a first pair of electrodes connected to be responsive to the first AC source capacitively coupled to a first portion of the optical waveguide arrangement for modulating the optical wave propagating in the first portion of the optical waveguide arrangement and for deriving a coherent optical wave having amplitude variations dependent on the first AC source, a second pair of electrodes connected to be responsive to the second AC source capacitively coupled to a second portion of the optical waveguide arrangement for modulating the optical wave propagating in the second portion of the optical waveguide arrangement and for deriving a coherent optical wave having amplitude variations dependent on the second AC source, the first and second portions of the optical waveguide arrangement being coupled together for combining the wave modulated in the first portion and the wave modulated in the second portion to derive a third modulated coherent optical wave.

2. The apparatus of claim 1 wherein the second portion of the optical waveguide arrangement is cascaded with first portion of the optical waveguide arrangement so that the second portion of the optical waveguide arrangement can derive the third coherent optical wave as including components containing the sum and difference frequencies of the first and second AC electric signal sources.

3. The apparatus of claim 2 further including an optical-electric transducer positioned to be responsive to the optical wave the second portion of the optical waveguide arrangement derives.

4. The apparatus of claim 1 wherein the optical waveguide arrangement includes a third portion connected to be responsive to optical waves the first and second portions derive.

5. The apparatus of claim 4 wherein the first, second and third portions are arranged so the optical waves the first and second portions derive propagate toward each other when entering the third portion, the third portion including an output optical waveguide segment responsive to the optical waves propagating toward the third portion from the first and second portions.

6. The apparatus of claim 5 further including first and second one-way mirrors positioned with respect to the first, second and third portions so that: (a) the first one-way mirror is arranged to couple the coherent optical wave the first portion derives to the third portion while preventing coupling of the coherent optical wave the second portion derives to the first portion, and (b) the second one-way mirror is arranged to couple the coherent optical wave the second portion derives to the third portion while preventing coupling of the coherent optical wave the first portion derives to the second portion.

7. The apparatus of claim 6 wherein the output optical waveguide segment is at an oblique angle to the aligned optical segments.

8. The apparatus of claim 7 further including an optical-electric transducer positioned to be responsive to the optical wave propagating in the output optical waveguide segment.

9. The apparatus of claim 1 further including an optical-electric transducer positioned to be responsive to the third optical wave.

10. The apparatus of claim 1 wherein the optical waveguide arrangement includes fiber optic waveguides embedded in a solid dielectric, each of the first and second portions of the optical waveguide arrangement including first and second spaced electrodes, the first and second spaced electrodes in the first portion being carried by the solid dielectric and connected to be responsive to the first source, the first and second spaced electrodes in the second portion being carried by the solid dielectric and connected to be responsive to the second source.

11. The apparatus of claim 1 wherein the frequencies of the first and second AC sources and the first and second portions of the optical waveguide arrangement are such that the third modulated coherent optical wave includes a component that is a beat frequency of the first and second AC electric signal sources.

* * * * *